May 18, 1937. W. B. POHLE 2,080,632
VEHICLE BRAKE CONTROL
Filed May 16, 1933
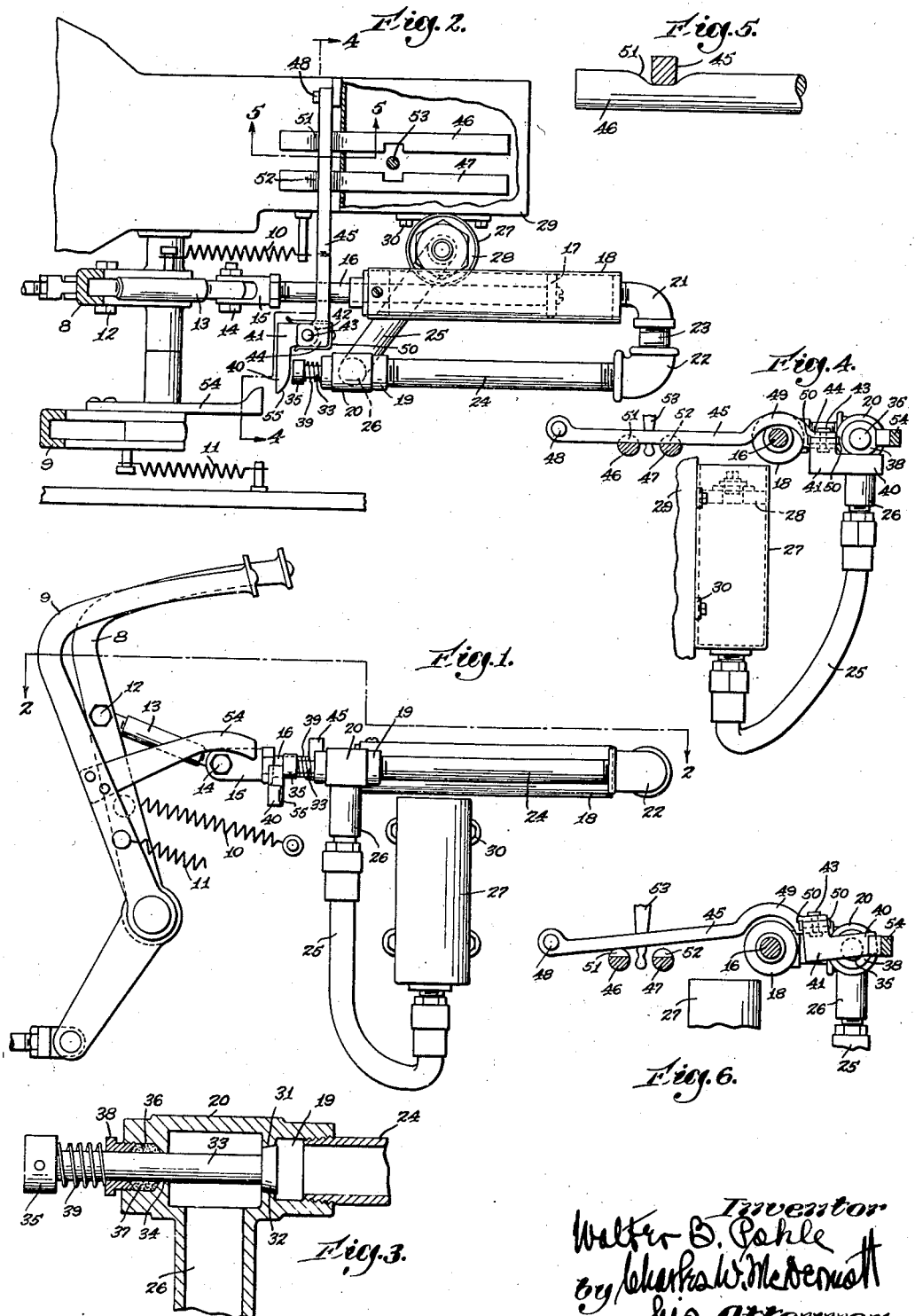
Inventor
Walter B. Pohle
by Charles W. McDermott
his Attorney Patented May 18, 1937

2,080,632

UNITED STATES PATENT OFFICE 2,080,632

VEHICLE BRAKE CONTROL

Walter B. Pohle, East Lynn, Mass.

Application May 16, 1933, Serial No. 671,291

11 Claims. (Cl. 192—4)

The present invention relates to motor vehicles, and more particularly to mechanism for controlling the brakes thereof.

In operating an automobile in cities where there are street intersections situated on the side of a hill, it often becomes necessary for the driver to stop on the hill because of traffic requirements. While no difficulty is involved in bringing the automobile to a stop, frequently great difficulty and danger are encountered in restarting the automobile when traffic is to move onward. With automobiles as presently constructed, restarting them on a hill requires a particularly rapid and deft foot movement on the part of the driver. As soon as the brake pedal is released, the automobile begins to slip backward down the hill, so that the driver must quickly transfer the right foot from the brake pedal to the accelerator while releasing the clutch pedal with the left foot, in order to start the car forward with a minimum of backward slipping. When traffic is lined up on a hill waiting for a "Go" signal, it frequently happens that one automobile, in trying to start forward, first slips backward in collision with the automobile behind it. Apart from the possibility of collisions, the backward slipping throws a heavy burden on the motor and causes the transmission mechanism to be subjected to a severe and unnatural strain, since releasing the clutch pedal serves to start the automobile forward while it is already moving in the reverse direction. In any event, the backward slipping occurring in the interval elapsing after the driver takes his foot off the brake pedal until he places it upon the accelerator is a constant source of discomfort and creates a feeling of insecurity.

Accordingly, it is the principal object of the present invention to provide a motor vehicle with a construction by the use of which there may be prevented the backward slipping which generally occurs on a hill while the driver, in restarting his automobile, is removing the right foot from the brake pedal and is placing it upon the accelerator.

To the accomplishment of this object a feature of the present invention contemplates the provision in an automobile provided with clutch and brake operating means, of means for operatively connecting them together so that the brake may be released from the clutch operating means.

Broadly considered, the operative connection between the clutch and brake operating means may take any form found suitable or expedient. It is preferred, however, to employ a hydraulic mechanism for maintaining the brake pedal in braking position and an operative connection between the clutch pedal and the hydraulic mechanism for releasing it to cause a release of the brake pedal. With such a construction, the brake pedal is maintained in braking position by the hydraulic mechanism until it is released by the clutch pedal, and the driver of the automobile may freely remove his foot from the brake pedal to operate the accelerator without having the automobile in the meantime slip backward, since until the clutch pedal is released, the brake pedal is maintained in its braking position even though the driver has removed his foot from the pedal.

Other features of the present invention reside in certain devices, combinations, and arrangements of parts, fully set forth hereinafter and then pointed out in the claims, and possessing advantages which will be readily apparent to those skilled in this art.

The illustrated embodiment of the present invention will be readily understood from an inspection of the accompanying drawing illustrating the best form of the invention at present known to the inventor, in which, Figure 1 is a view in side elevation showing the present invention incorporated with the clutch and brake pedals of an automobile;

Fig. 2 is a view in plan, part of the transmission housing being shown cut away, taken along the line 2—2, Fig. 1;

Fig. 3 is an enlarged detail view in sectional elevation of the valve housing and the valve carried thereby;

Fig. 4 is a detail view in sectional elevation taken along the line 4—4, Fig. 2, with the transmission in neutral;

Fig. 5 is a detail view in elevation, partially in section, taken along the line 5—5, Fig. 2, and Fig. 6 is a detail view in sectional elevation taken along the line 4—4, Fig. 2, but with the transmission in its third speed position.

In the illustrated embodiment of the present invention there is shown at 8 (Fig. 1) an ordinary pivoted brake pedal of an automobile and at 9 an ordinary pivoted clutch pedal, each being connected to the usual heavy retractile springs 10 and 11, respectively. Pivoted to the shank of the brake pedal 8 by means of a bolt 12 (Figs. 1 and 2) is one end of a turnbuckle 13 the other end of which is pivoted by means of a bolt 14 to a clevis 15 threaded on one end of a rod 16. The free end of the rod 16 is provided with a piston 17 (Fig. 2) mounted within a horizontal cylinder 18 which may be suitably secured to the frame of the automobile. The cylinder 18 is connected to an outlet 19 of a valve housing 20 (Figs. 1, 2, and 3) by means of piping which, in the illustrated embodiment of the present invention, comprises elbows 21 and 22, a nipple 23, and a pipe 24. One end of a flexible hose 25 (Figs. 1 and 2) is connected to an outlet 26 of the valve housing 20, and the other end of the hose 25 is connected to the bottom of a vertical cylinder 27 (Fig. 1) which is partially filled with some suitable, incompressible fluid, such as glycerine or oil. The fluid in the cylinder 27 supports a plunger 28. The cylinder may be secured to a wall of the transmission housing 29 by means of studs 30, as shown in Figs. 2 and 4.

The outlet 19 of the valve housing 20 is provided with a frusto-conical seat 31 (Fig. 3) adapted to receive a frusto-conical valve 32 provided with a stem 33 which extends through a passage 34 in the housing 20 to a point outside it, and terminates in a head 35. The wall of the housing 20 beyond which the stem 33 extends is provided with a cavity 36 for packing 37 held in place by a gland 38. Interposed between the head 35 and the gland 38 is a spring 39 coiled about the valve stem 33. The spring 39 maintains the valve 32 normally closed upon its seat 31.

With this construction, when the driver depresses the brake pedal 8, the piston 17 is moved forward (to the left, viewing Fig. 2) and the movement of the piston creates a condition of unbalanced pressure upon the fluid between the cylinders 18 and 27. Atmospheric pressure equalizes this unbalanced condition by operating upon the plunger 28, forcing it downwardly in the cylinder 27 and thereby causing fluid to flow from the cylinder 27 through the tubing 25, past the valve 32 (which is opened by the moving fluid since the spring 39 is not strong enough to resist the force of the atmospheric pressure), into the piping 21, 22, 23, and 24, and so into the cylinder 18. As soon as the driver begins to remove his foot from the brake pedal 8, the retractile spring 10 tends to pull the pedal back to its normal position. This tends to move the piston 17 backward (to the right, viewing Fig. 2) to force the fluid against the valve 32 and close it upon its seat 31. Any further return movement of the fluid is thereby checked. The fluid is thus trapped between the piston 17 and the closed valve 32, and the retractile spring 10 is powerless to pull the brake pedal 8 back to its normal position. The spring 39 serves to speed up the closing of the valve 32, though it is apparent that the spring is not necessary to effect a valve closure. As soon as the piston 17 ceases to move forward, the condition of unbalanced pressure disappears and the fluid stops moving through the valve 32. The tension of the spring 39 is then no longer overcome by the fluid, and the spring expands to close the valve.

With this construction when the brake pedal 8 has been depressed and the valve 32 has been closed, the brake pedal will remain depressed and the brake mechanism will remain in braking position until the valve 32 is opened. In order to open the valve 32 so that the brake pedal and the brake mechanism may be released, the head 35 on the stem 33 is adapted to be depressed by one end 40 of an L-shaped finger 41 (Fig. 2) the other end 42 of which is pivoted by means of a vertical pin 43 (Figs. 2 and 4) to a yoke 44 formed on one end of an arm 45. The arm 45 rests upon the slides 46 and 47 (Figs. 2, 4, and 6) of the gear shifting mechanism (not shown), the portions of the slides 46 and 47 which support the arm 45 being extended as shown in Fig. 2 to project outside the transmission housing 29 in a well known manner. The end of the arm 45 opposite its yoked end is pivoted to a horizontal pin 48 secured to a wall of the casing forming an extension of the transmission housing 29. The arm 45 is provided with an upwardly curved portion 49 (Fig. 4) so that the arm at all times clears the rod 16 to which the piston 17 is secured. The end 40 of the finger 41 is held normally spaced in front of the head 35 by means of a U-shaped spring 50 (Fig. 2) secured to the yoke 44, the arms of the spring embracing the sides of the pivoted end 42 of the finger 41.

The slides 46 and 47 of the gear shifting mechanism (a standard gear shift being indicated simply for illustration) are provided with transverse grooves 51 and 52, respectively, (Figs. 2, 4, and 6) which are aligned when the transmission is in neutral. The grooves 51 and 52, when aligned, are positioned directly under the arm 45 (Fig. 2) and receive the arm, as shown in Fig. 4. In this position, the end 40 of the finger 41 is held below the head 35 as shown in Fig. 4, out of alignment with any part of the head 35. As indicated in Fig. 5, the groove 51 of the slide 46 is provided with sloping walls, and the groove 52 in the slide 47 is identical with the groove 51. With this construction, when the gear shifting lever 53 moves one of the slides 46 and 47, either forward or backward, the groove in that slide is withdrawn from beneath the arm 45 so that the arm rests upon the ungrooved portion of the slide. This operation serves to swing the arm 45 upwardly, as shown in Fig. 6, thereby elevating the finger 41 so that its end 40 is substantially aligned with the head 35. In this position the end 40 of the finger 41 is spaced slightly ahead of the head 35 by reason of the spring 50.

It will be seen that so long as the finger 41 is spaced from the head 35, even though the finger is aligned with the head, the valve 32 will remain closed. In order to cause the finger 41 to depress the head 35 so that the valve 32 may be opened, the clutch pedal 9 is provided with a rearwardly extending arm 54 (Figs. 1, 2, 4, and 6) which partakes of the movement of the pedal 9 when the retractile spring 11, upon a release of the pedal by the driver, pulls the pedal rearwardly upon its pivot. The arm 54 is adapted to strike the finger 41 when the arm 45 is raised by reason of the transmission being in gear, as indicated in Fig. 6. By making the arm 54 long enough so that the finger 41 is struck before the arm stops moving, the finger 41 is swung on its pivot into engagement with the head 35, thereby depressing it against the tension of the spring 39 to open the valve 32. As soon as the valve 32 is opened the heavy brake pedal retractile spring 10 causes the piston 17 to force the fluid back into the cylinder 27 and its connected piping, and the brakes are released since the valve 32 no longer offers a resistance to a return movement of the fluid. So long as the arm 54 engages the finger 41, the head 35 will be depressed and the valve 32 will be maintained open so that the brakes will remain released.

As shown in Fig. 2, the end 40 of the finger 41 which engages the head 35 is provided with a rounded surface 55. The purpose of this rounded construction is to insure that the finger 41 will always depress the head 35 axially so that there will be a minimum of wear on the stem 33. If the surface 55 were flat, it would engage only an edge of the head 35, and the partially lateral thrust that would be thus imparted to the head would cause increased friction and wear of the stem 33 and the passage 34.

Fig. 6 shows the position of the arm 45 and the finger 41 when the transmission is in its third speed position, an ungrooved portion of the slide 46 serving to elevate the arm and the finger. The same elevation of course results when the transmission is in its second speed position. It is clear that when the transmission is in its reverse or first speed positions, the arm 45 will be elevated by the ungrooved portion of the slide 47, but since the slide 47 is spaced farther from the pivot pin 48 than is the slide 46, the elevation of the finger 41 will not be so great when the transmission is in reverse or first as when it is in second or third. However, the difference in the elevations will be slight, so that the end 40 of the finger 41 will be still substantially aligned with the head 35 and will be held only slightly lower than is shown in Fig. 6.

In explaining the operation of the present invention let it be assumed that the automobile is being driven. In this situation the brakes are not in operation, the arm 45 is elevated by reason of the transmission being in gear so that the end 40 of the finger 41 is substantially aligned with the head 35, and since the driver is not depressing the clutch pedal 9, the retractile spring 11 is causing the arm 54 to press the rounded surface 55 of the finger 41 against the head 35 to maintain the valve 32 open. The piston 17 is positioned in the cylinder 18 as shown in Fig. 2, and has expelled most of the fluid into the cylinder 27 and its connected piping. Suppose now that for some reason, such as adverse traffic lights, the automobile must be brought to a stop upon a hill. The driver depresses his clutch and brake pedals to halt the automobile, and throws the transmission into neutral. The act of depressing the clutch pedal 9 retracts the arm 54 from the finger 41 to remove the pressure exerted against the head 35 so that the open valve 32 tends to close under the influence of the spring 39. However, the act of depressing the brake pedal 8 moves the piston 17 forward and thereby causes atmospheric pressure, acting on the plunger 28 as has been explained, to force the fluid from the cylinder 27 against and past the valve 32 and into the cylinder 18 so that the valve remains open. As soon as the brakes are applied, that is, as soon as the brake pedal is fully depressed, the movement of the piston 17 ceases, and the spring 39, coupled with any back pressure exerted by the fluid against the valve 32, causes the valve to close. In this manner liquid is trapped between the piston 17 and the closed valve 32, and the closed valve effectively checks a return movement of the fluid towards the cylinder 27. Since throwing the transmission into neutral lowers the arm 45 and so withdraws the finger 41 from a position where it can engage the head 35, the driver may remove his foot from the brake and clutch pedals, for the trapped fluid in the cylinder 18 becomes a substitute for the driver's foot and holds the brakes on against the tension of the retractile spring 10, and the withdrawal of the finger 41 prevents the opening of the valve 32 when the clutch pedal is released.

When a change in the traffic lights occurs, the driver depresses the clutch pedal 9 and throws the transmission into gear. This being done, the driver has merely to release the clutch pedal while operating the accelerator, in order to restart the automobile. The retractile spring 11 causes the clutch pedal 9, and with it the arm 54, to swing rearwardly. Since the transmission is now in gear, the arm 45 is elevated so that the rounded surface 55 of the finger 41 is in a position to engage the head 35. When the rearwardly moving arm 54 strikes the finger 41, the head 35 is depressed and the valve is opened. Since this operation serves to release the check afforded by the valve 32, there is no longer any resistance to the action of the brake pedal retractile spring 10, and consequently this spring causes the piston 17 to force the fluid past the open valve 32 into the cylinder 27 so that the brakes are thereby released.

With this mode of operation there is completely eliminated the danger of that backward movement downhill by the automobile which now exists when the driver removes his foot from the brake pedal to operate the accelerator. There is also eliminated the strain on the motor and the transmission which has heretofore been occasioned when the clutch pedal is released to drive the automobile forward while it is slipping backward. So long as the clutch pedal is depressed, the driver may take his foot from the brake pedal, and position it in readiness to operate the accelerator, and when, but not until, the clutch pedal is released, the brake is automatically thrown off.

If it is desired merely to slow up the automobile without stopping it, the driver depresses the brake pedal 8 in precisely the same manner as in slowing up automobiles as presently constructed. Since the clutch pedal 9 is not touched in this operation, the arm 54 remains engaged with the finger 41, and the valve 32 remains open. As a consequence, when the driver removes his foot from the brake pedal, it is immediately retracted to normal position by the spring 10 since the open valve 32 offers no resistance to the movement of the piston 17 in the cylinder 18. If for any reason the driver, in merely slowing up the automobile, depresses both the clutch and brake pedals so that the valve 32 becomes closed, the release of the clutch pedal reopens the valve and automatically causes a release of the brake pedal.

It will be seen that for merely bringing an automobile to a halt and then restarting it, the finger 41 and the arm 45 are really unnecessary, since the arm 54 could be constructed to strike the head 35 directly, and the operation of the foot brake would remain unchanged. But this construction would always cause the arm 54 to open the valve 32 when the clutch pedal is released, with the result that it would be impossible to use the foot brake to hold the automobile stationary while parked on a hill with the transmission in neutral unless the driver maintains the clutch pedal depressed. The arm 45 makes it possible to prevent the opening of the valve 32 when the transmission is in neutral and the clutch pedal 9 is released. When the transmission is in neutral, the arm 45 rests in the aligned grooves 51 and 52, as has been explained above. In this position, the finger 41 is held below the head 35 as shown in Fig. 4. Consequently, when the driver comes to a stop, places the transmission in neutral, and releases the clutch pedal 9, allowing it to move rearwardly, the arm 54 is spaced from the head 35, and in such a position can not move the head to open the valve 32.

Nothing herein explained is to be interpreted as limiting the invention in the scope of its application to use in connection with the particular type of clutch, or brake, or transmission mechanism, or the particular mode of operation selected for purposes of illustration and explanation. While the particulars of construction herein set forth are well suited to one form of the invention, it is not limited to these details of construction, nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:

1. In an automobile, the combination with clutch, brake, and transmission operating means, of means for operatively connecting the clutch and brake operating means, said connecting means comprising a check for the brake operating means, a movable check-releasing member operatively connected to the transmission operating means so as to be placed in position for operative movement by throwing the transmission into driving speed position, and means moved by the clutch operating means for moving the positioned member to cause it to release the check.

2. In an automobile, the combination with clutch and brake pedals, retractile springs for operating the pedals to throw the clutch in and the brake out, respectively, transmission operating means, means responsive to actuation of the brake pedal independently of the clutch pedal when the transmission is in neutral for holding the brake pedal in its brake-on position against the influence of its spring, and a member operatively connected to the transmission operating means for tripping the brake pedal to restore it to the influence of its spring, said member being movable to an operative position by throwing the transmission into driving speed position and being movable to an inoperative position by throwing the transmission into neutral, of means for actuating said member from the clutch pedal during its movement under the influence of its spring to trip the brake pedal when the transmission is in driving speed position.

3. In an automobile, the combination with clutch and brake pedals, and a hydraulic check responsive to actuation of the brake pedal independently of the clutch pedal for holding the brake pedal in braking position, of means for releasing the check from the clutch pedal.

4. In an automobile, the combination with clutch and brake pedals, of a hydraulic check for the brake pedal, said check having a direct connection with the brake pedal and a breakable connection with the clutch pedal.

5. In an automobile, the combination with clutch and brake pedals, transmission operating means, a hydraulic mechanism including a piston connected to the brake pedal and adapted to move in one direction when the brake pedal is depressed, and a check valve for preventing the piston from returning to its normal condition and for holding the brake pedal depressed, of means operatively connected to the transmission operating means for operatively connecting the clutch pedal with the valve to open it.

6. In an automobile, the combination with clutch and brake pedals, a brake pedal retractile spring, a source of fluid supply, a cylinder for receiving fluid from the source of supply, a piston within said cylinder operatively connected to the brake pedal for causing fluid to flow from the source of supply into the cylinder when the brake pedal is depressed against the tension of its spring, and a valve, operating when closed, to prevent the expulsion of the fluid from the cylinder under the influence of the tensioned brake pedal spring, of means operatively connected to the clutch pedal for opening the valve.

7. In an automobile, the combination with clutch and brake operating means, and a hydraulic check operable independently of the clutch operating means for holding the brake operating means in braking position, of means for connecting the clutch operating means with the check to release it.

8. In an automobile, the combination with clutch and brake pedals, and a hydraulic check operable independently of the clutch pedal for holding the brake pedal in braking position, of means for releasing the check from the clutch pedal.

9. In an automobile, the combination with clutch and brake pedals, transmission operating means, and a hydraulic check operable independently of the clutch pedal for holding the brake pedal in braking position, of means operatively connected to the transmission operating means for connecting the clutch pedal with the check to release it.

10. In an automobile, the combination with clutch, brake, and transmission operating means, and a check operable independently of the clutch and transmission operating means for holding the brake operating means in braking position, of means including a member operatively connected to the transmission operating means and engageable with the check and the clutch operating means for releasing the check.

11. In an automobile, the combination with clutch, brake, and transmission operating means, and a hydraulic check operable independently of the clutch and transmission operating means for holding the brake operating means in braking position, of means including a member operatively connected to the transmission operating means cooperating with the clutch operating means for releasing the check.

WALTER B. POHLE.